United States Patent
Liang et al.

(10) Patent No.: US 11,876,746 B2
(45) Date of Patent: Jan. 16, 2024

(54) DATA TRANSMISSION METHOD AND COMMUNICATIONS DEVICE

(71) Applicant: VIVO MOBILE COMMUNICATION CO., LTD., Guangdong (CN)

(72) Inventors: Jing Liang, Chang'an Dongguan (CN); Yue Ma, Chang'an Dongguan (CN); Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 399 days.

(21) Appl. No.: 17/214,336

(22) Filed: Mar. 26, 2021

(65) Prior Publication Data

US 2021/0218535 A1 Jul. 15, 2021

Related U.S. Application Data

(63) Continuation of application No. PCT/CN2019/106678, filed on Sep. 19, 2019.

(30) Foreign Application Priority Data

Sep. 27, 2018 (CN) .......................... 201811133799.6

(51) Int. Cl.
*H04L 5/00* (2006.01)

(52) U.S. Cl.
CPC ................. *H04L 5/0053* (2013.01)

(58) Field of Classification Search
CPC ..... H04L 27/2601; H04L 1/00; H04L 5/0053; H04L 5/0048; H04L 5/00; H04W 28/0268; H04W 28/10; H04W 76/10; H04W 80/02; H04W 76/12; H04W 28/02; H04W 80/10; H04W 76/20; H04W 28/06;
(Continued)

(56) References Cited

U.S. PATENT DOCUMENTS 10,028,170 B2* 7/2018 Lee .................. H04W 74/0833
2003/0210714 A1* 11/2003 Wu ...................... H04W 28/06
370/503

(Continued)

FOREIGN PATENT DOCUMENTS

CN 101116277 A 1/2008
CN 103582010 A 2/2014
(Continued)

OTHER PUBLICATIONS

EP Search Report in Application No. 19865666.2 dated Nov. 11, 2021.
(Continued)

*Primary Examiner* — Nathan S Taylor
(74) *Attorney, Agent, or Firm* — Maschoff Brennan

(57) ABSTRACT

This disclosure provides a data transmission method and a communications device. The data transmission method includes: generating a plurality of RRC segments by using an RRC segmentation function of an RRC layer entity of the sender communications device or an RRC segmentation function of a new protocol layer entity, where each of the plurality of RRC segments carries partial data content of an RRC message generated by the sender communications device; and sending the plurality of RRC segments to a receiver communications device.

17 Claims, 3 Drawing Sheets

Generate a plurality of RRC segments by using an RRC segmentation function of an RRC layer entity of a sender communications device or an RRC segmentation function of a new protocol layer entity — 101

Send the plurality of RRC segments to a receiver communications device — 102

(58) Field of Classification Search
CPC ... H04W 74/002; H04W 76/15; H04W 76/30; H04W 72/20; H04W 74/00; H04W 72/04
See application file for complete search history.

(56) References Cited

U.S. PATENT DOCUMENTS

| | | | |
|---|---|---|---|
| 2015/0131552 A1* | 5/2015 | He | H04L 12/6418 370/329 |
| 2016/0227480 A1* | 8/2016 | Tsuboi | H04W 48/18 |
| 2016/0234644 A1* | 8/2016 | Belghoul | G01S 5/0236 |
| 2016/0254881 A1* | 9/2016 | Meylan | H04L 1/188 370/216 |
| 2017/0202032 A1* | 7/2017 | Tan | H04W 24/02 |
| 2018/0199315 A1* | 7/2018 | Hong | H04L 47/34 |
| 2019/0200212 A1* | 6/2019 | Quan | H04W 76/27 |
| 2019/0215717 A1* | 7/2019 | Lee | H04W 72/21 |
| 2019/0253924 A1* | 8/2019 | Kim | H04W 28/0273 |
| 2020/0107394 A1* | 4/2020 | Lee | H04L 69/322 |
| 2021/0218535 A1* | 7/2021 | Liang | H04L 5/0053 |
| 2022/0150693 A1* | 5/2022 | Kim | H04W 28/065 |

FOREIGN PATENT DOCUMENTS

| | | | | |
|---|---|---|---|---|
| CN | 107251585 A | | 10/2017 | |
| CN | 107258064 A | | 10/2017 | |
| EP | 2568735 B1 * | | 4/2015 | H04W 24/08 |
| EP | 3100569 A1 | | 12/2016 | |
| EP | 3962161 A1 * | | 3/2022 | H04W 72/04 |
| WO | WO-2008094662 A2 * | | 8/2008 | H04L 1/0007 |
| WO | 2015085897 A1 | | 6/2015 | |
| WO | WO-2017192164 A1 * | | 11/2017 | H04W 80/02 |
| WO | WO-2017200562 A1 * | | 11/2017 | H04L 69/321 |
| WO | WO-2018084632 A1 * | | 5/2018 | H04B 7/15542 |
| WO | WO-2019005092 A1 * | | 1/2019 | H04L 67/04 |

OTHER PUBLICATIONS

"Scheduling and Segmentation of system information" TSG-RAN Working Group 2 (Radio layer 2 and Radio layer 3), TSGR#7(99)A90, Ericsson, Sep. 20, 1999.
CN Office Action in Application No. 201811133799.6 dated Mar. 26, 2021.
"Managing larger Capability containers" 3GPP TSG-RAN WG2 Meeting #101, Qualcomm Incorporated, R2-1803629, Feb. 26, 2018.
"Huge RRC message transmission" 3GPP TSG-RAN WG2 Meeting #103bis, Apple, R2-1815005, Oct. 8, 2018.
Written Opinion and International Search Report in Application No. PCT/CN2019/106678 dated Apr. 8, 2021.
JP Office Action in Application No. 2021-517645 dated May 30, 2022.
"Transmission mode for BCCH" 3GPP TSG-RAN WG2 Meeting #59, Ericsson, R2-073237, Aug. 20, 2007.
"RRC aspects for the direct signalling path from secondary node to the UE" 3GPP TSG-RAN WG2 NR Adhoc, Nokia, Alcatel-Lucent Shanghai Bell, R2-1700055, Jan. 17, 2017.
"Benefits of disabling RLC segmentation" 3GPP TSG-RAN2 Meeting #98, OPPO, R2-1704055, May 15, 2017.
"Segmented Radio Capability Report" SA WG2 Meeting #128Bis, Huawei, Hisilicon, S2-188073, Aug. 20, 2018.
Indian Office Action from Corresponding IN Application No. 202127018974, dated Feb. 14, 2022.

* cited by examiner

DATA TRANSMISSION METHOD AND COMMUNICATIONS DEVICE

CROSS-REFERENCE TO RELATED APPLICATIONS

This application is a continuation of PCT Application No. PCT/CN2019/106678 filed on Sep. 19, 2019, which claims priority to Chinese Patent Application No. 201811133799.6, filed in China on Sep. 27, 2018, which is incorporated herein by reference in its entirety.

TECHNICAL FIELD

This disclosure relates to the field of communications technologies, and in particular, to a data transmission method and a communications device.

BACKGROUND

In a fifth-generation (5G) mobile communications technology system or a long term evolution (LTE) system, an air interface capability of a terminal, such as user equipment (UE), is reported through a radio resource control (RRC) layer. In cases in which, for example, a quantity of frequency band combinations increases, capabilities of combined frequency bands vary, or both multiple-input multiple-output (MIMO) and radio frequency (RF) capabilities are different, capability reporting for UE may need to occupy very large space. For example, during 5G air interface capability reporting for UE, a maximum value of 1G bytes (byte) may be reached.

In addition, a new radio (NR) system has channel state information-reference signal (CSI-RS) related measurement configuration information and random access channel (RACH) configuration information. When the CSI-RS uses excessive resources, a corresponding RRC message is also excessively large.

Currently, a processing mechanism for an RRC layer entity is directly sending a generated RRC message to a packet data convergence protocol (PDCP) layer entity as an RRC protocol data unit (PDU), that is, a PDCP service data unit (SDU). However, a maximum size of a PDCP SDU is, for example, 8188 bytes (byte) in a 4G (4-th Generation) system, and 9000 bytes in a 5G system.

In this case, when the RRC message is excessively large, a limit of the PDCP SDU is exceeded, and excessively large burden is imposed on an RRC buffer, affecting smooth proceeding of a corresponding communication procedure.

SUMMARY

Embodiments of this disclosure provide a data transmission method and a communications device, to resolve an existing problem that when an RRC message is excessively large, a limit of a PDCP SDU is exceeded, and excessively large burden is imposed on an RRC buffer.

According to a first aspect, an embodiment of this disclosure provides a data transmission method, applied to a sender communications device. The sender communications device is one of a terminal or a network device. The method includes:

generating a plurality of RRC segments by using an RRC segmentation function of an RRC layer entity of the sender communications device or an RRC segmentation function of a new protocol layer entity, where each of the plurality of RRC segments carries partial data content of an RRC message generated by the sender communications device; and sending the plurality of RRC segments to a receiver communications device.

According to a second aspect, an embodiment of this disclosure provides a data transmission method, applied to a receiver communications device. The receiver communications device is one of a terminal or a network device. The method includes:

receiving a plurality of RRC segments from a sender communications device, where each of the plurality of RRC segments carries partial data content of an RRC message generated by the sender communications device; and reassembling the plurality of RRC segments by using an RRC reassembly function of an RRC layer entity of the receiver communications device or an RRC reassembly function of a new protocol layer entity, to obtain the complete RRC message.

According to a third aspect, an embodiment of this disclosure provides a communications device. The communications device is a sender. The communications device is one of a terminal or a network device. The communications device includes:

a generation module, configured to generate a plurality of RRC segments by using an RRC segmentation function of an RRC layer entity of the communications device or an RRC segmentation function of a new protocol layer entity, where each of the plurality of RRC segments carries partial data content of an RRC message generated by the communications device; and a first sending module, configured to send the plurality of RRC segments to a receiver communications device.

According to a fourth aspect, an embodiment of this disclosure provides a communications device. The communications device is a receiver. The communications device is one of a terminal or a network device. The communications device includes:

a fourth receiving module, configured to receive a plurality of RRC segments from a sender communications device, where each of the plurality of RRC segments carries partial data content of an RRC message generated by the sender communications device; and a reassembly module, configured to reassemble the plurality of RRC segments by using an RRC reassembly function of an RRC layer entity of the communications device or an RRC reassembly function of a new protocol layer entity, to obtain the complete RRC message.

According to a fifth aspect, an embodiment of this disclosure provides a communications device, including a memory, a processor, and a program that is stored in the memory and capable of running on the processor, where when the program is executed by the processor, the steps of the foregoing data transmission method may be implemented. Optionally, the communications device may be a sender or a receiver, or may be a terminal or a network device.

According to a sixth aspect, an embodiment of this disclosure provides a computer-readable storage medium that stores a program, where when the program is executed by a processor, the steps of the foregoing data transmission method may be implemented.

In the embodiments of this disclosure, the plurality of RRC segments are generated by using the RRC segmentation function, where each of the plurality of RRC segments carries partial data content of the RRC message generated by the sender communications device, and all data content of the RRC message is carried in the plurality of RRC segments; and the plurality of RRC segments are sent to the receiver communications device. In this way, the RRC message can be segmented. Therefore, when the RRC message is excessively large, adaptation to a PDCP SDU can be implemented, to reduce burden on an RRC buffer, and complete transmission of the RRC message, thereby ensuring smooth proceeding of a corresponding communication procedure.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following descriptions show only some embodiments of this disclosure, and a person of ordinary skill in the art may still derive other drawings from these accompanying drawings without creative efforts.

DESCRIPTION OF EMBODIMENTS

Figure 1:
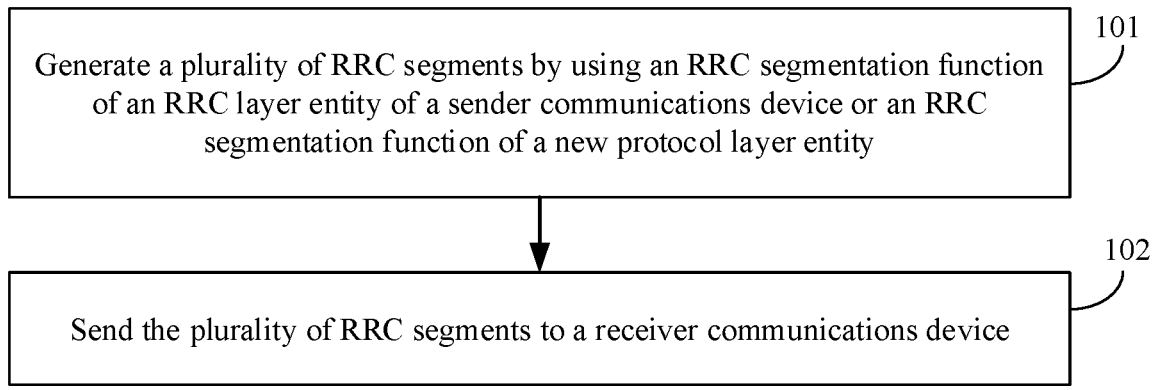
FIG. 1 is a flowchart of a data transmission method according to an embodiment of this disclosure.

To describe the technical solutions in the embodiments of this disclosure more clearly, the following briefly describes the accompanying drawings required for describing the embodiments of this disclosure. Apparently, the accompanying drawings in the following descriptions show only some embodiments of this disclosure, and a person of ordinary skill in the art may still derive other drawings from these accompanying drawings without creative efforts.

First, it should be noted that, to resolve a problem in a related technology that when an RRC message is excessively large, a limit of a PDCP SDU is exceeded, and excessively large burden is imposed on an RRC buffer, an RRC segmentation function is introduced in the embodiments of this disclosure. The RRC segmentation function may be implemented by an RRC layer entity, or may be implemented by a new protocol layer entity. In this way, an excessively large RRC message may be segmented by using the introduced RRC segmentation function, to obtain a plurality of RRC segments. The plurality of RRC segments may carry all data content of the corresponding RRC message. Each of the plurality of RRC segments may carry partial data content of the corresponding RRC message, and each RRC segment is transferred to a PDCP layer entity as a PDCP SDU. Therefore, when the RRC message is excessively large, adaptation to a PDCP SDU can be implemented, to reduce burden on an RRC buffer, and complete transmission of the RRC message, thereby ensuring smooth proceeding of a corresponding communication procedure.

During specific implementation, after a sender communications device (which may be referred to as a sender for short) generates an RRC message, a corresponding transmission procedure may be sequentially as follows: from a sender RRC layer entity to a sender PDCP layer entity, then to a sender RLC layer entity, then to a sender MAC layer entity, then to a sender PHY layer entity, then to a receiver (that is, a receiver communications device) PHY layer entity, then to a receiver MAC layer entity, then to a receiver RLC layer entity, then to a receiver PDCP layer entity, and finally to a receiver RRC layer entity. In this way, an RRC segment generated by using the RRC segmentation function may exist in an RRC PDU form for the sender, and may be received by a receiver as a PDCP SDU, that is, the RRC PDU may be equivalent to the PDCP SDU.

In a wireless communications system, a dual connectivity (DC) architecture may be used for a terminal, and correspondingly includes two cell groups: a master cell group (MCG) and a secondary cell group (SCG). The MCG corresponds to a network-side master node (MN), and the SCG corresponds to a network-side secondary node (SN). The MCG may include a primary cell PCell and a secondary cell SCell, and the SCG may include a primary secondary cell PSCell and a secondary cell SCell. The PCell and the PSCell may also be collectively referred to as an SpCell. Bearer types may include a signaling radio bearer (SRB) and a data radio bearer (DRB). An MCG SRB (or DRB) transmits or receives data by using only the MCG. An SCG SRB (or DRB) transmits or receives data by using only the SCG. A split SRB (or DRB) transmits or receives data by using both the MCG and the SCG.

When the DC architecture is used, an LTE cell may serve as an MCG cell, and an NR (New RAT, new radio, namely, 5G) cell may serve as an SCG cell. In the DC architecture, a core network to which the terminal is connected is an LTE core network, for example, an evolved packet core (EPC). In the DC architecture, an NR configuration may be used for a PDCP layer entity corresponding to the MCG (that is, the PDCP layer entity is configured to an NR PDCP layer entity), and LTE configurations are still used for other configurations in the MCG, including configurations of the RLC layer entity, the MAC layer entity, and the like.

The following describes a data transmission method of this disclosure with reference to the embodiments and the accompanying drawings.

Referring to FIG. 1, an embodiment of this disclosure provides a data transmission method, applied to a sender communications device. The sender communications device may be either a terminal or a network device. The method includes the following steps 101 and 102.

Step 101: Generate a plurality of RRC segments by using an RRC segmentation function of an RRC layer entity of the sender communications device or an RRC segmentation function of a new protocol layer entity.

For the sender, the RRC segment may exist in an RRC PDU form. Each of the plurality of RRC segments carries partial data content of an RRC message generated by the sender communications device. All data content of the RRC message may be carried in the plurality of RRC segments. The generating a plurality of RRC segments may be understood as segmenting the generated RRC message by using the RRC segmentation function of the RRC layer entity or the new protocol layer entity of the sender communications device, to obtain the plurality of RRC segments. That is, with the RRC segmentation function, the generated RRC message may be divided into the plurality of RRC messages for transmission.

It can be understood that, during specific implementation, in an uplink data transmission procedure, a sender communications device is a terminal, and a receiver communications device is a network device; and in a downlink data transmission procedure, a sender communications device is a network device, and a receiver communications device is a terminal.

For example, if the sender communications device is UE 1, and an RRC message generated by the UE 1 occupies 15000 bytes (which exceeds a limit of a PDCP SDU), the UE 1 may segment the RRC message into an RRC PDU 1 (which for example occupies 7000 bytes) and an RRC PDU 2 (which for example occupies 8000 bytes) by using the RRC segmentation function of the RRC layer entity (or the new protocol layer entity), or segment the RRC message into an RRC PDU 1 (which for example occupies 4000 bytes), an RRC PDU 2 (which for example occupies 4000 bytes), and an RRC PDU 3 (which for example occupies 6000 bytes), to adapt to the PDCP SDU, and complete transmission of the RRC message.

It should be noted that segmenting the message into two segments or three segments is merely used as an example in the foregoing embodiment, and during specific implementation, the message may be alternatively segmented into four segments or the like. This is not limited in this embodiment of this disclosure. For how to segment the RRC message, that is, how to choose bytes occupied by an RRC segment, the sender may make a choice as required, or may make a choice according to a preset rule.

Step 102: Send the plurality of RRC segments to a receiver communications device.

In this way, after receiving the plurality of RRC segments, the receiver communications device may reassemble the plurality of RRC segments, to obtain the complete RRC message.

In the data transmission method in this embodiment of this disclosure, the plurality of RRC segments are generated by using the RRC segmentation function, where each of the plurality of RRC segments carries partial data content of the RRC message generated by the sender communications device; and the plurality of RRC segments are sent to the receiver communications device. In this way, the RRC message can be segmented. Therefore, when the RRC message is excessively large, adaptation to a PDCP SDU can be implemented, to reduce burden on an RRC buffer, and complete transmission of the RRC message, thereby ensuring smooth proceeding of a corresponding communication procedure.

In a specific embodiment of this disclosure, optionally, packet assembly information of the RRC segments may include reassembly indication information, and the reassembly indication information is used for the receiver communications device to reassemble the plurality of received RRC segments, to obtain the complete RRC message. The packet assembly information may be an information element in a packet header form or another form.

Further, the reassembly indication information may include at least one of the following:

segmentation information (SI), a sequence number (SN), an segmentation offset (SO), and priority indication information.

Optionally, the segmentation information may be used to indicate a location of a corresponding RRC segment in an RRC message, that is, a location, in all data content of the RRC message, of partial data content of the RRC message that is carried in the corresponding RRC segment. In this way, the receiver may determine a location of an RRC segment in a corresponding RRC message based on the segmentation information, to complete reassembly of the corresponding RRC message.

For example, during specific implementation, the segmentation information may include X bits, and a typical value of X may be 2. The segmentation information may be used to indicate that the corresponding RRC segment is at the first (first), in the middle (middle), or at the last (last) of the RRC message. A meaning of an X-bit field in another form may be different from this. In addition, when no segmentation is performed, the segmentation information may alternatively indicate that an RRC message corresponding to a related RRC PDU is not segmented.

Optionally, the sequence number may be used to indicate a sequence number of an RRC message corresponding to a related RRC segment. In this way, the receiver may determine, based on the sequence number, RRC segments of a same RRC message, to complete reassembly of the RRC message.

It should be noted that, when an RRC duplication function is enabled, the reassembly indication information needs to include the sequence number, so that the receiver identifies RRC segments of a same RRC message. For example, during specific implementation, the sequence number may include Y bits, and a typical value of Y may be 1 or 2.

Optionally, the segmentation offset may be used to indicate an offset location of a corresponding RRC segment in an RRC message, that is, an offset location, in all data content of the RRC message, of partial data content of the RRC message that is carried in the corresponding RRC segment. It should be noted that, when PDCP SDUs are transferred out of order, the reassembly indication information needs to include the segmentation offset, to differentiate locations, in an RRC message, of RRC segments at similar locations. For example, during specific implementation, the segmentation offset may include P bits, and a typical value of P may be 2 or 3. Alternatively, the segmentation offset may be in a segment number form. A specific form of an offset is not limited in this disclosure. If the segment number form is used, Z bits may be used.

For example, it is assumed that an RRC message generated by UE is segmented into an RRC PDU 1, an RRC PDU 2, an RRC PDU 3, and an RRC PDU 4, and respective SI indicates that the RRC PDU 1 is at the first of the RRC message, the RRC PDU 2 is in the middle of the RRC message, the RRC PDU 3 is in the middle of the RRC message, and the RRC PDU 4 is at the last of the RRC message. In this case, after receiving the RRC PDU 2 and the RRC PDU 3, the receiver cannot differentiate sequential locations of the RRC PDU 2 and the RRC PDU 3 (but only knows that the RRC PDU 2 and the RRC PDU 3 are in the middle of the RRC message). However, the sequential locations of the RRC PDU 2 and the RRC PDU 3 can be differentiated based on an offset location indicated by an SO, that is, the RRC PDU 2 is located before the RRC PDU 3, so as to complete reassembly of the RRC message.

Optionally, the priority indication information may be used to indicate a reassembly priority of an RRC message corresponding to a related RRC segment, to complete reassembly of the RRC message based on the priority. For example, if there are a plurality of RRC messages that need to be reassembled, the plurality of RRC messages may be sequentially reassembled based on priorities according to priority indication information included in RRC segments corresponding to the RRC messages.

In a specific embodiment of this disclosure, the packet assembly information of the RRC segments may further include a reserved bit (R bit). The reserved bit may be used when a new function is subsequently added. To ensure that the packet assembly information occupies an integer quantity of bytes (byte align), a location with less than 1 byte may be filled with a reserved bit.

In a specific embodiment of this disclosure, optionally, when the sender communications device is a terminal, the new protocol layer entity may be one of the following cases:

per-SRB (per-SRB), per-DRB (per-DRB), per-terminal (per-UE), and per-cell group (per-cell group).

Alternatively, when the sender communications device is a network device, the new protocol layer entity may be one of the following cases:

per-SRB (per-SRB), per-DRB (per-DRB), and per-cell group (per-cell group).

The per-SRB may be understood as follows: procedures such as establishment and release of the new protocol layer entity are affected by procedures such as establishment and release of a related SRB. For example, when an SRB is released, a corresponding new protocol layer entity also needs to be released, or each SRB corresponds to one new protocol layer entity.

The per-DRB may be understood as follows: procedures such as establishment and release of the new protocol layer entity are affected by procedures such as establishment and release of a related DRB. For example, when a DRB is released, a corresponding new protocol layer entity also needs to be released, or each DRB corresponds to one new protocol layer entity.

The per-UE may be understood as follows: A new protocol layer entity is retained by a terminal itself, and the terminal may have one or more new protocol layer entities that are not affected by procedures such as establishment and release of an SRB (or a DRB), or network-side configurations.

The per-cell group may be understood as follows: A new protocol layer entity is affected by DC configurations of a terminal. For example, an MCG may correspond to a new protocol layer entity, and an SCG may correspond to a new protocol layer entity.

In a specific embodiment of this disclosure, based on the foregoing cases of the new protocol layer entity, the new protocol layer entity may be established, released, reset, and/or the like in different manners. Descriptions are shown below.

Optionally, when the sender communications device is a terminal, and the new protocol layer entity is per-cell group, the method may further include:

receiving, by the terminal, cell group configuration information from a network device, where the cell group configuration information includes configuration-related information of the new protocol layer entity, and the cell group configuration information may be carried in dedicated signaling (for example, an RRC reconfiguration message) of the network device; and when the new protocol layer entity has not been established, establishing, by the terminal based on the configuration-related information of the new protocol layer entity, a new protocol layer entity corresponding to an MCG and/or an SCG; or when the new protocol layer entity has been established, resetting, releasing, or initiating a reconfiguration procedure for the new protocol layer entity, by the terminal, based on the configuration-related information of the new protocol layer entity.

Alternatively, when the sender communications device is a network device, and the new protocol layer entity is per-cell group, the method may further include:

obtaining, by the network device, cell group configuration information, where the cell group configuration information includes configuration-related information of the new protocol layer entity; and when the new protocol layer entity has not been established, establishing, by the network device based on the configuration-related information of the new protocol layer entity, a new protocol layer entity corresponding to an MCG and/or an SCG; or when the new protocol layer entity has been established, resetting, releasing, or reconfiguring, by the network device, the new protocol layer entity based on the configuration-related information of the new protocol layer entity.

The resetting the new protocol layer entity may be understood as follows: Reassembly indication information, such as SI, an SN, and/or an SO, corresponding to the new protocol layer entity is reset to zero, or is reset to an initial value.

Optionally, when the sender communications device is a terminal, and the new protocol layer entity is per-SRB, the method may further include:

receiving, by the terminal, SRB configuration information from a network device, where the SRB configuration information may be carried in dedicated signaling (for example, an RRC reconfiguration message) of the network device; and establishing and/or releasing, by the terminal based on the SRB configuration information, a new protocol layer entity corresponding to a related SRB, where optionally, when the new protocol layer entity is released, all suspended PDUs and/or SDUs of the protocol layer entity may need to be discarded.

Alternatively, when the sender communications device is a network device, and the new protocol layer entity is per-SRB, the method may further include:

obtaining, by the network device, SRB configuration information; and establishing and/or releasing, by the network device based on the SRB configuration information, a new protocol layer entity corresponding to a related SRB, where optionally, when the new protocol layer entity is released, all suspended PDUs and/or SDUs of the protocol layer entity may need to be discarded.

Optionally, when the sender communications device is a terminal, and the new protocol layer entity is per-DRB, the method may further include:

receiving, by the terminal, DRB configuration information from a network device, where the DRB configuration information may be carried in dedicated signaling (for example, an RRC reconfiguration message) of the network device; and establishing and/or releasing, by the terminal based on the DRB configuration information, a new protocol layer entity corresponding to a related DRB, where optionally, when the new protocol layer entity is released, all suspended PDUs and/or SDUs of the protocol layer entity may need to be discarded.

Alternatively, when the sender communications device is a network device, and the new protocol layer entity is per-DRB, the method may further include:

obtaining, by the network device, DRB configuration information; and establishing and/or releasing, by the network device based on the DRB configuration information, a new protocol layer entity corresponding to a related DRB, where optionally, when the new protocol layer entity is released, all suspended PDUs and/or SDUs of the protocol layer entity may need to be discarded.

It can be understood that a new protocol layer entity of the terminal corresponds to a new protocol layer entity of the network device. For example, if the network device needs to release the new protocol layer entity (a sending entity) of the network device, the network device needs to first send signaling to the terminal to release the new protocol layer entity (a receiving entity) of the terminal, and then release the new protocol layer entity of the network device.

In a specific embodiment of this disclosure, an RRC segmentation function (which may correspond to an RRC layer entity or a new protocol layer entity) of the terminal may be activated by using activation signaling of the network device, or may be deactivated by using deactivation signaling of the network device.

Optionally, when the sender communications device is a terminal, the method may further include:

receiving, by the terminal, activation signaling for an RRC segmentation function from a network device, where the RRC segmentation function may belong to the RRC layer entity, or may belong to the new protocol layer entity; and activating, by the terminal, the RRC segmentation function according to the activation signaling;

or receiving, by the terminal, deactivation signaling for an RRC segmentation function from a network device, where the RRC segmentation function may belong to the RRC layer entity, or may belong to the new protocol layer entity; and deactivating, by the terminal, the RRC segmentation function according to the deactivation signaling.

Further, the activation signaling may be in at least one of the following forms:

a MAC control element (CE), downlink control information (DCI), and an RRC message.

The deactivation signaling may be in at least one of the following forms:

a MAC CE, DCI, and an RRC message.

Further, an activation condition (to be specific, when the condition is met, the network device may send activation signaling to the terminal) for the RRC segmentation function may be at least one of the following:

the network device receives partial capability information reported by the terminal;

the network device receives capability-related information sent by the terminal, where the capability-related information indicates that capability information of the terminal exceeds a maximum size of a PDCP SDU;

the network device receives assistance information sent by the terminal, where the assistance information indicates that capability information of the terminal exceeds a maximum size of a PDCP SDU; or the network device receives an RRC segmentation function activation request message sent by the terminal.

Optionally, the capability-related information may include at least one of the following:

information indicating that capability information of the terminal exceeds a maximum size of a PDCP SDU;

a size of capability information of the terminal, which may be for example 10000 bytes; or information indicating that the terminal supports the RRC segmentation function.

Further, a deactivation condition (to be specific, when the condition is met, the network device may send deactivation signaling to the terminal) for the RRC segmentation function may be at least one of the following:

the network device has not received, within a preset time, partial capability information reported by the terminal;

the network device has not received, within a preset time, capability-related information sent by the terminal, where the capability-related information indicates that capability information of the terminal exceeds a maximum size of a PDCP SDU;

the network device has not received, within a preset time, assistance information sent by the terminal, where the assistance information indicates that capability information of the terminal exceeds a maximum size of a PDCP SDU;

the network device receives an RRC segmentation function deactivation request message sent by the terminal; or sizes of all RRC messages received by the network device from the terminal within a preset time are less than a first preset threshold.

It can be understood that duration of the preset time may be an absolute value, or may be indicated by maintaining a timer (timer). A determining condition for the duration or the timer may be one or any combination of the following: An agreement is made in a protocol in advance; the network device (for example, a base station) performs configuration or re-configuration; or the network device (for example, a base station) negotiates with the terminal. The preset time included in the foregoing deactivation condition may be the same or different in different deactivation conditions based on specific cases. This is not limited in this embodiment of this disclosure.

The first preset threshold may be one of the following cases:

in a 4G system, a maximum size, that is, 8188 bytes, of a data packet of a PDCP SDU at a PDCP layer;

in a 5G system, a maximum size, that is, 9000 bytes, of a data packet of a PDCP SDU at a PDCP layer; or a byte size agreed upon in a protocol or configured by the network device.

In a specific embodiment of this disclosure, optionally, if the RRC segmentation function is completed by the new protocol layer entity, activating or deactivating the RRC segmentation function by the network device may also be performed by establishing, reconfiguring, or releasing a corresponding protocol layer entity.

Optionally, when the RRC layer entity or the new protocol layer entity that carries the RRC segmentation function is per-SRB (that is, configured in a per-SRB manner), the activation signaling may include activation indication information for a related SRB, and the deactivation signaling may include deactivation indication information for a related SRB; or when the RRC layer entity or the new protocol layer entity that carries the RRC segmentation function is per-DRB (that is, configured in a per-DRB manner), the activation signaling may include activation indication information for a related DRB, and the deactivation signaling may include deactivation indication information for a related DRB; or when the RRC layer entity or the new protocol layer entity that carries the RRC segmentation function is per-cell group (that is, configured in a per-cell group manner), the activation signaling may include activation indication information for a corresponding MCG and/or SCG, and the deactivation signaling may include deactivation indication information for a corresponding MCG and/or SCG; or when the RRC segmentation function takes effect for a preset RRC message, the activation signaling may include indication information used to indicate an RRC message to which the activation signaling is specific (that is, an RRC message or a type of RRC message to which the activation signaling is specific), and the deactivation signaling may include indication information used to indicate an RRC message to which the deactivation signaling is specific (that is, an RRC message or a type of RRC message to which the deactivation signaling is specific).

In a specific embodiment of this disclosure, the RRC segmentation function of the RRC layer entity or the new protocol layer entity may take effect only for a preset RRC message (that is, a specific RRC message).

Optionally, when the sender communications device is a terminal, the corresponding RRC segmentation function may be specific to at least one of the following RRC messages:

an RRC message that carries a data portion with a size greater than a second preset threshold; or an RRC message used to report a terminal capability.

The second preset threshold may be one of the following cases:

in a 4G system, a maximum size, that is, 8188 bytes, of a data packet of a PDCP SDU at a PDCP layer;

in a 5G system, a maximum size, that is, 9000 bytes, of a data packet of a PDCP SDU at a PDCP layer; or a byte size agreed upon in a protocol or configured by the network device.

Alternatively, when the sender communications device is a network device, the corresponding RRC segmentation function may be specific to at least one of the following RRC messages:

an RRC message that carries a data portion with a size greater than a third preset threshold;

an RRC reconfiguration message;

an RRC message that carries CSI-RS related measurement configuration information; or an RRC message that carries RACH configuration information.

The third preset threshold may be one of the following cases:

in a 4G system, a maximum size, that is, 8188 bytes, of a data packet of a PDCP SDU at a PDCP layer;

in a 5G system, a maximum size, that is, 9000 bytes, of a data packet of a PDCP SDU at a PDCP layer; or a byte size agreed upon in a protocol or configured by the network device.

It can be understood that, during specific implementation, the first preset threshold, the second preset threshold, and the third preset threshold may be the same or different based on specific cases.

Figure 2:
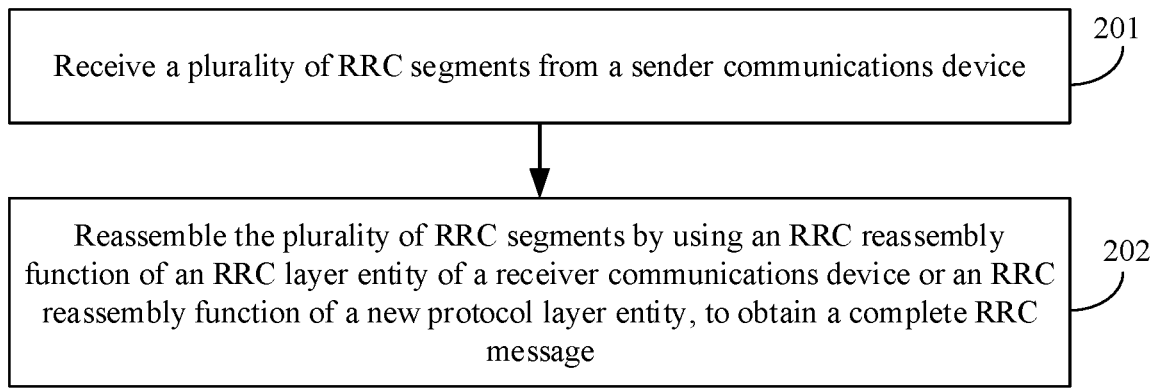
FIG. 2 is a flowchart of another data transmission method according to an embodiment of this disclosure.

Referring to FIG. 2, an embodiment of this disclosure provides a data transmission method, applied to a receiver communications device. The receiver communications device may be either a terminal or a network device. The method includes the following steps 201 and 202.

Step 201: Receive a plurality of RRC segments from a sender communications device.

For the receiver, the RRC segment may be received as a PDCP SDU. Each of the plurality of RRC segments carries partial data content of an RRC message generated by the sender communications device. All data content of the RRC message may be carried in the plurality of RRC segments.

Step 202: Reassemble the plurality of RRC segments by using an RRC reassembly function of an RRC layer entity of the receiver communications device or an RRC reassembly function of a new protocol layer entity, to obtain the complete RRC message.

In the data transmission method in this embodiment of this disclosure, the RRC message can be segmented. Therefore, when the RRC message is excessively large, adaptation to a PDCP SDU can be implemented, to reduce burden on an RRC buffer, and complete transmission of the RRC message, thereby ensuring smooth proceeding of a corresponding communication procedure.

In a specific embodiment of this disclosure, optionally, when the receiver communications device is a terminal, the new protocol layer entity is one of the following cases:

per-SRB, per-DRB, per-terminal, and per-cell group; or when the receiver communications device is a network device, the new protocol layer entity is one of the following cases:

per-SRB, per-DRB, and per-cell group.

Optionally, when the receiver communications device is a terminal, and the new protocol layer entity is per-cell group, the method further includes:

receiving cell group configuration information from a network device, where the cell group configuration information includes configuration-related information of the new protocol layer entity; and when the new protocol layer entity has not been established, establishing, based on the configuration-related information of the new protocol layer entity, a new protocol layer entity corresponding to an MCG and/or an SCG; or when the new protocol layer entity has been established, resetting, releasing, or initiating a reconfiguration procedure for the new protocol layer entity based on the configuration-related information of the new protocol layer entity.

Alternatively, when the receiver communications device is a network device, and the new protocol layer entity is per-cell group, the method further includes:

obtaining cell group configuration information, where the cell group configuration information includes configuration-related information of the new protocol layer entity; and when the new protocol layer entity has not been established, establishing, based on the configuration-related information of the new protocol layer entity, a new protocol layer entity corresponding to an MCG and/or an SCG; or when the new protocol layer entity has been established, resetting, releasing, or reconfiguring the new protocol layer entity based on the configuration-related information of the new protocol layer entity.

Optionally, when the receiver communications device is a terminal, and the new protocol layer entity is per-SRB or per-DRB, the method further includes: receiving SRB configuration information or DRB configuration information from a network device; and establishing and/or releasing, based on the SRB configuration information, a new protocol layer entity corresponding to a related SRB; or establishing and/or releasing, based on the DRB configuration information, a new protocol layer entity corresponding to a related DRB.

Alternatively, when the receiver communications device is a network device, and the new protocol layer entity is per-SRB or per-DRB, the method further includes:

obtaining SRB configuration information or DRB configuration information; and establishing and/or releasing, based on the SRB configuration information, a new protocol layer entity corresponding to a related SRB; or establishing and/or releasing, based on the DRB configuration information, a new protocol layer entity corresponding to a related DRB.

Optionally, when the receiver communications device is a terminal, the method further includes:

receiving activation signaling or deactivation signaling for the RRC reassembly function from a network device; and activating the RRC reassembly function according to the activation signaling, or deactivating the RRC reassembly function according to the deactivation signaling.

It can be understood that an RRC segmentation function of a sender corresponds to an RRC reassembly function of a receiver. For example, when activating an RRC segmentation function of the terminal by using activation signaling, the network device may also correspondingly activate an RRC reassembly function of the network device; or when deactivating an RRC segmentation function of the terminal by using deactivation signaling, the network device may also correspondingly deactivate an RRC reassembly function of the network device; or when activating an RRC reassembly function of the terminal by using activation signaling, the network device may also correspondingly activate an RRC segmentation function of the network device; or when deactivating an RRC reassembly function of the terminal by using deactivation signaling, the network device may also correspondingly deactivate an RRC segmentation function of the network device. In addition, during specific implementation, the RRC reassembly function of the terminal may alternatively not need to be activated by the network device, but is implemented by the terminal.

Optionally, when the RRC layer entity or the new protocol layer entity that carries the RRC reassembly function is per-SRB, the activation signaling includes activation indication information for a related SRB, and the deactivation signaling includes deactivation indication information for a related SRB; or when the RRC layer entity or the new protocol layer entity that carries the RRC reassembly function is per-DRB, the activation signaling includes activation indication information for a related DRB, and the deactivation signaling includes deactivation indication information for a related DRB; or when the RRC layer entity or the new protocol layer entity that carries the RRC reassembly function is per-cell group, the activation signaling may include activation indication information for a corresponding MCG and/or SCG, and the deactivation signaling may include deactivation indication information for a corresponding MCG and/or SCG.

Optionally, when the receiver communications device is a network device, the method further includes:

sending activation signaling or deactivation signaling to a terminal, where the activation signaling is used to indicate to activate an RRC segmentation function of an RRC layer entity of the terminal or an RRC segmentation function of a new protocol layer entity; and the deactivation signaling is used to indicate to deactivate the RRC segmentation function of the RRC layer entity of the terminal or the RRC segmentation function of the new protocol layer entity.

Optionally, an activation condition for the foregoing RRC segmentation function (which may belong to the RRC layer entity, or may belong to the new protocol layer entity) is at least one of the following:

the network device receives partial capability information reported by the terminal;

the network device receives capability-related information sent by the terminal, where the capability-related information indicates that capability information of the terminal exceeds a maximum size of a packet data convergence protocol PDCP service data unit SDU;

the network device receives assistance information sent by the terminal, where the assistance information indicates that capability information of the terminal exceeds a maximum size of a PDCP SDU; or the network device receives an RRC segmentation function activation request message sent by the terminal.

Optionally, a deactivation condition for the foregoing RRC segmentation function (which may belong to the RRC layer entity, or may belong to the new protocol layer entity) is at least one of the following:

the network device has not received, within a preset time, partial capability information reported by the terminal;

the network device has not received, within a preset time, capability-related information sent by the terminal, where the capability-related information indicates that capability information of the terminal exceeds a maximum size of a PDCP SDU;

the network device has not received, within a preset time, assistance information sent by the terminal, where the assistance information indicates that capability information of the terminal exceeds a maximum size of a PDCP SDU;

the network device receives an RRC segmentation function deactivation request message sent by the terminal; or sizes of all RRC messages received by the network device from the terminal within a preset time are less than a first preset threshold.

The foregoing embodiment describes the data transmission method of this disclosure. The following describes a communications device of this disclosure with reference to the embodiments and the accompanying drawings.

Figure 3:
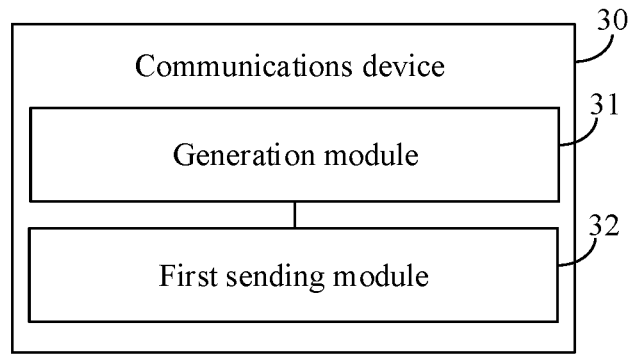
FIG. 3 is a first schematic structural diagram of a communications device according to an embodiment of this disclosure.

Referring to FIG. 3, an embodiment of this disclosure further provides a communications device 30. The communications device 30 is a sender. The communications device 30 may be either a terminal or a network device. The communications device 30 may include:

a generation module 31, configured to generate a plurality of RRC segments by using an RRC segmentation function of an RRC layer entity of the communications device 30 or an RRC segmentation function of a new protocol layer entity, where each of the plurality of RRC segments carries partial data content of an RRC message generated by the communications device 30; and a first sending module 32, configured to send the plurality of RRC segments to a receiver communications device.

In this embodiment of this disclosure, the RRC message can be segmented. Therefore, when the RRC message is excessively large, adaptation to a PDCP SDU can be implemented, to reduce burden on an RRC buffer, and complete transmission of the RRC message, thereby ensuring smooth proceeding of a corresponding communication procedure.

In this embodiment of this disclosure, optionally, when the communications device 30 is the terminal, the new protocol layer entity is one of the following cases:

per-SRB, per-DRB, per-terminal, and per-cell group; or when the communications device 30 is the network device, the new protocol layer entity is one of the following cases:

per-SRB, per-DRB, and per-cell group.

Optionally, when the communications device 30 is the terminal, and the new protocol layer entity is per-cell group, the communications device 30 further includes:

a first receiving module, configured to receive cell group configuration information from a network device, where the cell group configuration information includes configuration-related information of the new protocol layer entity; and a first processing module, configured to: when the new protocol layer entity has not been established, establish, based on the configuration-related information of the new protocol layer entity, a new protocol layer entity corresponding to an MCG and/or an SCG; or when the new protocol layer entity has been established, reset, release, or initiate a reconfiguration procedure for the new protocol layer entity based on the configuration-related information of the new protocol layer entity.

Alternatively, when the communications device 30 is the network device, and the new protocol layer entity is per-cell group, the communications device 30 further includes:

a first obtaining module, configured to obtain cell group configuration information, where the cell group configuration information includes configuration-related information of the new protocol layer entity; and a second processing module, configured to: when the new protocol layer entity has not been established, establish, based on the configuration-related information of the new protocol layer entity, a new protocol layer entity corresponding to an MCG and/or an SCG; or when the new protocol layer entity has been established, reset, release, or reconfigure the new protocol layer entity based on the configuration-related information of the new protocol layer entity.

Optionally, when the communications device 30 is the terminal, and the new protocol layer entity is per-SRB or per-DRB, the communications device 30 further includes:

a second receiving module, configured to receive SRB configuration information or DRB configuration information from a network device; and a third processing module, configured to establish and/or release, based on the SRB configuration information, a new protocol layer entity corresponding to a related SRB; or establish and/or release, based on the DRB configuration information, a new protocol layer entity corresponding to a related DRB.

Alternatively, when the communications device 30 is the network device, and the new protocol layer entity is per-SRB or per-DRB, the communications device 30 further includes:

a second obtaining module, configured to obtain SRB configuration information or DRB configuration information; and a fourth processing module, configured to establish and/or release, based on the SRB configuration information, a new protocol layer entity corresponding to a related SRB; or establish and/or release, based on the DRB configuration information, a new protocol layer entity corresponding to a related DRB.

Optionally, when the communications device 30 is the terminal, the communications device 30 further includes:

a third receiving module, configured to receive activation signaling or deactivation signaling for the RRC segmentation function from a network device; and a fifth processing module, configured to activate the RRC segmentation function according to the activation signaling, or deactivate the RRC segmentation function according to the deactivation signaling.

Optionally, an activation condition for the RRC segmentation function is at least one of the following:

the network device receives partial capability information reported by the terminal;

the network device receives capability-related information sent by the terminal, where the capability-related information indicates that capability information of the terminal exceeds a maximum size of a packet data convergence protocol PDCP service data unit SDU;

the network device receives assistance information sent by the terminal, where the assistance information indicates that capability information of the terminal exceeds a maximum size of a PDCP SDU; or the network device receives an RRC segmentation function activation request message sent by the terminal.

Optionally, a deactivation condition for the RRC segmentation function is at least one of the following:

the network device has not received, within a preset time, partial capability information reported by the terminal;

the network device has not received, within a preset time, capability-related information sent by the terminal, where the capability-related information indicates that capability information of the terminal exceeds a maximum size of a PDCP SDU;

the network device has not received, within a preset time, assistance information sent by the terminal, where the assistance information indicates that capability information of the terminal exceeds a maximum size of a PDCP SDU;

the network device receives an RRC segmentation function deactivation request message sent by the terminal; or sizes of all RRC messages received by the network device from the terminal within a preset time are less than a first preset threshold.

Optionally, the activation signaling is in at least one of the following forms:

a MAC CE, DCI, and an RRC message; and the deactivation signaling is in at least one of the following forms:

a MAC CE, DCI, and an RRC message.

Optionally, when the RRC layer entity or the new protocol layer entity that carries the RRC segmentation function is per-SRB, the activation signaling includes activation indication information for a related SRB, and the deactivation signaling includes deactivation indication information for a related SRB; or when the RRC layer entity or the new protocol layer entity that carries the RRC segmentation function is per-DRB, the activation signaling includes activation indication information for a related DRB, and the deactivation signaling includes deactivation indication information for a related DRB; or when the RRC layer entity or the new protocol layer entity that carries the RRC segmentation function is per-cell group, the activation signaling includes activation indication information for a corresponding MCG and/or SCG, and the deactivation signaling includes deactivation indication information for a corresponding MCG and/or SCG; or when the RRC segmentation function takes effect for a preset RRC message, the activation signaling includes indication information used to indicate an RRC message to which the activation signaling is specific, and the deactivation signaling includes indication information used to indicate an RRC message to which the deactivation signaling is specific.

Optionally, when the communications device 30 is the terminal, the RRC segmentation function is specific to at least one of the following RRC messages:

an RRC message that carries a data portion with a size greater than a second preset threshold; or an RRC message used to report a terminal capability.

Alternatively, when the communications device 30 is the network device, the RRC segmentation function is specific to at least one of the following RRC messages:

an RRC message that carries a data portion with a size greater than a third preset threshold;

an RRC reconfiguration message;

an RRC message that carries CSI-RS related measurement configuration information; or an RRC message that carries RACH configuration information.

Figure 4:
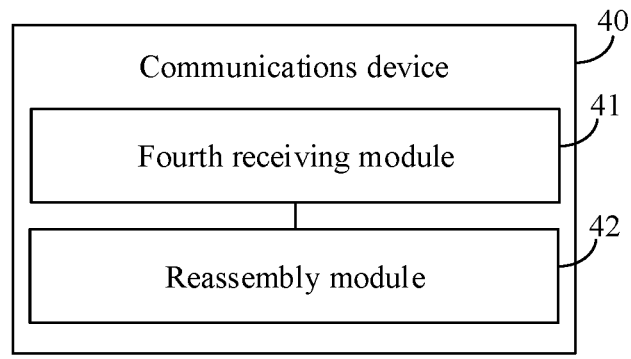
FIG. 4 is a second schematic structural diagram of a communications device according to an embodiment of this disclosure.

Referring to FIG. 4, an embodiment of this disclosure further provides a communications device 40. The communications device 40 is a receiver. The communications device 40 may be either a terminal or a network device. The communications device 40 may include:

a fourth receiving module 41, configured to receive a plurality of RRC segments from a sender communications device, where each of the plurality of RRC segments carries partial data content of an RRC message generated by the sender communications device; and a reassembly module 42, configured to reassemble the plurality of RRC segments by using an RRC reassembly function of an RRC layer entity of the communications device 40 or an RRC reassembly function of a new protocol layer entity, to obtain the complete RRC message.

In this embodiment of this disclosure, the RRC message can be segmented. Therefore, when the RRC message is excessively large, adaptation to a PDCP SDU can be implemented, to reduce burden on an RRC buffer, and complete transmission of the RRC message, thereby ensuring smooth proceeding of a corresponding communication procedure.

In this embodiment of this disclosure, optionally, when the communications device 40 is the terminal, the new protocol layer entity is one of the following cases:

per-SRB, per-DRB, per-terminal, and per-cell group; or when the communications device 40 is the network device, the new protocol layer entity is one of the following cases:

per-SRB, per-DRB, and per-cell group.

Optionally, when the communications device 40 is the terminal, and the new protocol layer entity is per-cell group, the communications device 40 further includes:

a fifth receiving module, configured to receive cell group configuration information from a network device, where the cell group configuration information includes configuration-related information of the new protocol layer entity; and a sixth processing module, configured to: when the new protocol layer entity has not been established, establish, based on the configuration-related information of the new protocol layer entity, a new protocol layer entity corresponding to an MCG and/or an SCG; or when the new protocol layer entity has been established, reset, release, or initiate a reconfiguration procedure for the new protocol layer entity based on the configuration-related information of the new protocol layer entity.

Alternatively, when the communications device 40 is the network device, and the new protocol layer entity is per-cell group, the communications device 40 further includes:

a third obtaining module, configured to obtain cell group configuration information, where the cell group configuration information includes configuration-related information of the new protocol layer entity; and a seventh processing module, configured to: when the new protocol layer entity has not been established, establish, based on the configuration-related information of the new protocol layer entity, a new protocol layer entity corresponding to an MCG and/or an SCG; or when the new protocol layer entity has been established, reset, release, or reconfigure the new protocol layer entity based on the configuration-related information of the new protocol layer entity.

Optionally, when the communications device 40 is the terminal, and the new protocol layer entity is per-SRB or per-DRB, the communications device 40 further includes:

a sixth receiving module, configured to receive SRB configuration information or DRB configuration information from a network device; and an eighth processing module, configured to establish and/or release, based on the SRB configuration information, a new protocol layer entity corresponding to a related SRB; or establish and/or release, based on the DRB configuration information, a new protocol layer entity corresponding to a related DRB.

Alternatively, when the communications device 40 is the network device, and the new protocol layer entity is per-SRB the communications device 40 further includes:

a fourth obtaining module, configured to obtain SRB configuration information or DRB configuration information; and a ninth processing module, configured to establish and/or release, based on the SRB configuration information, a new protocol layer entity corresponding to a related SRB; or establish and/or release, based on the DRB configuration information, a new protocol layer entity corresponding to a related DRB.

Optionally, when the communications device 40 is the terminal, the communications device 40 further includes:

a seventh receiving module, configured to receive activation signaling or deactivation signaling for the RRC reassembly function from a network device; and a tenth processing module, configured to activate the RRC reassembly function according to the activation signaling, or deactivate the RRC reassembly function according to the deactivation signaling.

Optionally, when the RRC layer entity or the new protocol layer entity that carries the RRC reassembly function is per-SRB, the activation signaling includes activation indication information for a related SRB, and the deactivation signaling includes deactivation indication information for a related SRB; or when the RRC layer entity or the new protocol layer entity that carries the RRC reassembly function is per-DRB, the activation signaling includes activation indication information for a related DRB, and the deactivation signaling includes deactivation indication information for a related DRB; or when the RRC layer entity or the new protocol layer entity that carries the RRC reassembly function is per-cell group, the activation signaling includes activation indication information for a corresponding MCG and/or SCG, and the deactivation signaling includes deactivation indication information for a corresponding MCG and/or SCG.

Optionally, when the communications device 40 is the network device, the communications device 40 may further include:

a second sending module, configured to send activation signaling or deactivation signaling to a terminal, where the activation signaling is used to indicate to activate an RRC segmentation function of an RRC layer entity of the terminal or an RRC segmentation function of a new protocol layer entity; and the deactivation signaling is used to indicate to deactivate the RRC segmentation function of the RRC layer entity of the terminal or the RRC segmentation function of the new protocol layer entity.

Further, optionally, an activation condition for the RRC segmentation function is at least one of the following:

the network device receives partial capability information reported by the terminal;

the network device receives capability-related information sent by the terminal, where the capability-related information indicates that capability information of the terminal exceeds a maximum size of a PDCP SDU;

the network device receives assistance information sent by the terminal, where the assistance information indicates that capability information of the terminal exceeds a maximum size of a PDCP SDU; or the network device receives an RRC segmentation function activation request message sent by the terminal.

Further, optionally, a deactivation condition for the RRC segmentation function is at least one of the following:

the network device has not received, within a preset time, partial capability information reported by the terminal;

the network device has not received, within a preset time, capability-related information sent by the terminal, where the capability-related information indicates that capability information of the terminal exceeds a maximum size of a PDCP SDU;

the network device has not received, within a preset time, assistance information sent by the terminal, where the assistance information indicates that capability information of the terminal exceeds a maximum size of a PDCP SDU;

the network device receives an RRC segmentation function deactivation request message sent by the terminal; or sizes of all RRC messages received by the network device from the terminal within a preset time are less than a first preset threshold.

In addition, an embodiment of this disclosure further provides a communications device, including a processor, a memory, and a program that is stored in the memory and capable of running on the processor. When the program is executed by the processor, the processes in the foregoing embodiments of the data transmission method are implemented, and a same technical effect can be achieved. To avoid repetition, details are not described herein again. Optionally, the communications device may be a sender or a receiver, or may be a terminal or a network device.

Figure 5:
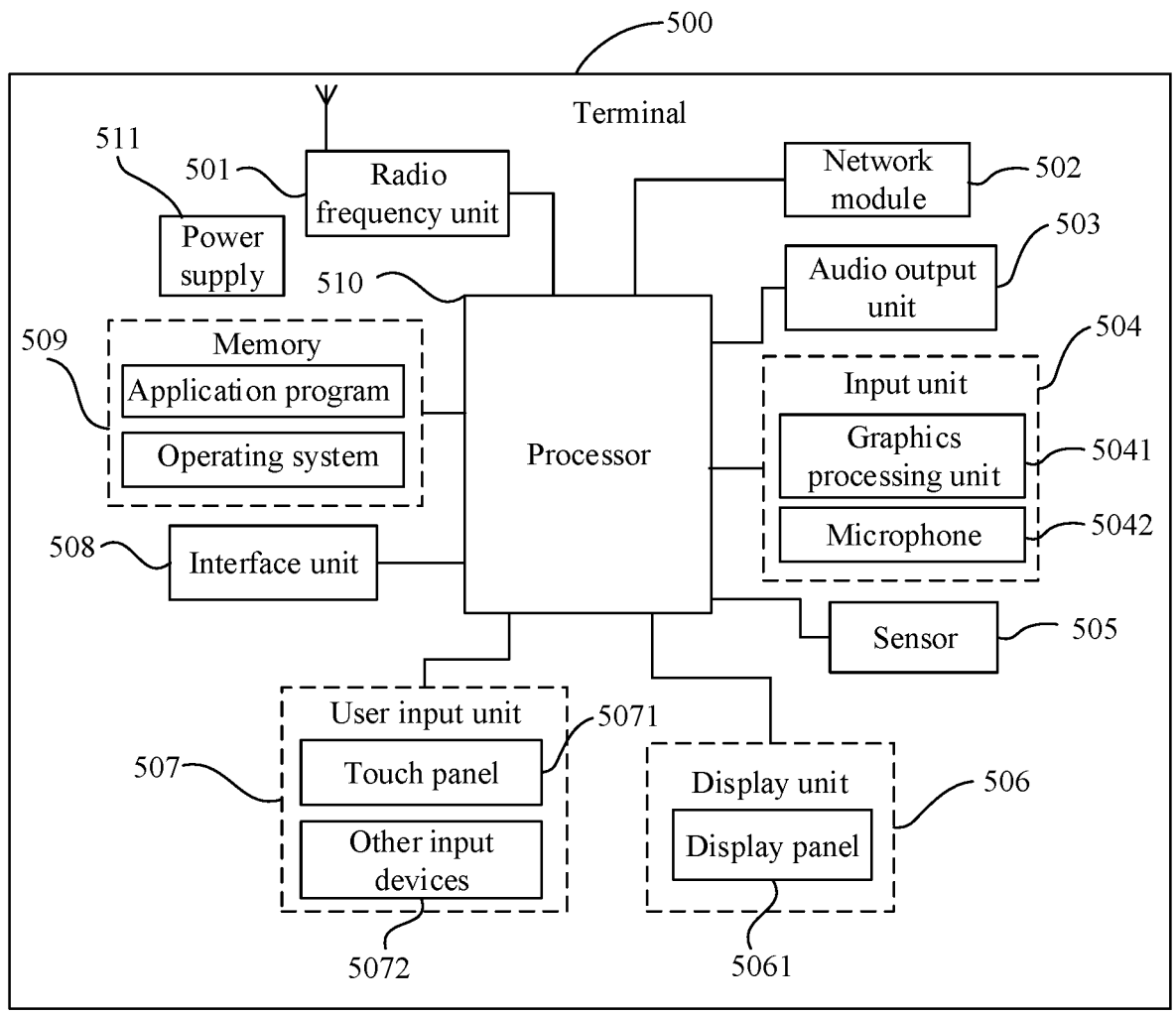
FIG. 5 is a schematic structural diagram of a terminal according to an embodiment of this disclosure.

Specifically, FIG. 5 is a schematic diagram of a hardware structure of a terminal for implementing the embodiments of this disclosure. The terminal 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that the terminal structure shown in FIG. 5 does not constitute a limitation to the terminal. The terminal may include more or fewer components than those shown in the figure, or some components may be combined, or there may be a different component layout. In this embodiment of this disclosure, the terminal includes, but is not limited to, a mobile phone, a tablet computer, a notebook computer, a palmtop computer, an in-vehicle terminal, a wearable device, a pedometer, and the like.

Optionally, when the terminal 500 is a sender, the processor 510 is configured to generate a plurality of RRC segments by using an RRC segmentation function of an RRC layer entity of the terminal 500 or an RRC segmentation function of a new protocol layer entity, where each of the plurality of RRC segments carries partial data content of an RRC message generated by the terminal 500; and the radio frequency unit 501 is configured to send the plurality of RRC segments to a network device.

Optionally, when the terminal 500 is a receiver, the radio frequency unit 501 is configured to receive a plurality of RRC segments from a network device, where each of the plurality of RRC segments carries partial data content of an RRC message generated by the network device; and reassemble the plurality of RRC segments by using an RRC reassembly function of an RRC layer entity of the terminal 500 or an RRC reassembly function of a new protocol layer entity, to obtain the complete RRC message.

In this embodiment of this disclosure, the RRC message can be segmented. Therefore, when the RRC message is excessively large, adaptation to a PDCP SDU can be implemented, to reduce burden on an RRC buffer, and complete transmission of the RRC message, thereby ensuring smooth proceeding of a corresponding communication procedure.

It should be understood that, in this embodiment of this disclosure, the radio frequency unit 501 may be configured to send or receive a signal in an information sending/receiving or call procedure. Specifically, the radio frequency unit 501 receives downlink data from a base station and sends the downlink data to the processor 510 for processing; and sends uplink data to the base station. Usually, the radio frequency unit 501 includes but is not limited to an antenna, at least one amplifier, a transceiver, a coupler, a low noise amplifier, a duplexer, and the like. In addition, the radio frequency unit 501 may further communicate with a network and another device by using a wireless communications system.

The terminal provides a user with wireless broadband Internet access by using the network module 502, for example, helps the user send or receive an email, browse a web page, access streaming media, and the like.

The audio output unit 503 may convert audio data into an audio signal, and output the audio signal as sound, where the audio data is received by the radio frequency unit 501 or the network module 502, or stored in the memory 509. In addition, the audio output unit 503 may further provide audio output (for example, a call signal reception tone or a message reception tone) that is related to a specific function performed by the terminal 500. The audio output unit 503 includes a loudspeaker, a buzzer, a phone receiver, and the like.

The input unit 504 is configured to receive an audio signal or a video signal. The input unit 504 may include a graphics processing unit (GPU) 5041 and a microphone 5042. The graphics processing unit 5041 processes image data of a static picture or a video that is obtained by an image capture apparatus (for example, a camera) in a video capture mode or an image capture mode. A processed image frame may be displayed on the display unit 506. An image frame processed by the graphics processing unit 5041 may be stored in the memory 509 (or another storage medium), or may be sent by the radio frequency unit 501 or the network module 502. The microphone 5042 may receive a sound, and can process the sound into audio data. In a phone call mode, processed audio data may be converted, for output, into a format for transmission by the radio frequency unit 501 to a mobile communications base station.

The terminal 500 further includes at least one sensor 505, for example, an optical sensor, a motion sensor, and another sensor. Specifically, the optical sensor includes an ambient light sensor and a proximity sensor. The ambient light sensor may adjust brightness of a display panel 5061 based on intensity of ambient light. When the terminal 500 moves near an ear, the proximity sensor may disable the display panel 5061 and/or backlight. As a motion sensor, an accelerometer sensor may detect for a value of an acceleration in various directions (there are usually three axes), may detect for a value and a direction of gravity when the terminal is still, and may be configured to recognize a posture of the terminal (for example, landscape/portrait mode switching, a related game, or magnetometer posture calibration), provide a function related to vibration recognition (for example, a pedometer or a keystroke), or the like. The sensor 505 may further include a fingerprint sensor, a pressure sensor, an iris sensor, a molecular sensor, a gyroscope, a barometer, a hygrometer, a thermometer, or an infrared sensor. Details are not described herein.

The display unit 506 is configured to display information entered by the user or information provided for the user. The display unit 506 may include the display panel 5061. Optionally, the display panel 5061 may be configured in a form of a liquid crystal display (LCD), an organic light-emitting diode (OLED), or the like.

The user input unit 507 may be configured to receive entered numerical or character information, and generate key signal input that is related to a user setting and function control of the terminal. Specifically, the user input unit 507 includes a touch panel 5071 and other input devices 5072. The touch panel 5071 is also referred to as a touchscreen, and may collect a touch operation of the user on or near the touch panel (for example, an operation performed on or near the touch panel 5071 by the user by using any appropriate object or accessory such as a finger or a stylus). The touch panel 5071 may include two parts: a touch detection apparatus and a touch controller. The touch detection apparatus detects for a touch orientation of the user, detects for a signal brought by the touch operation, and transmits the signal to the touch controller. The touch controller receives touch information from the touch detection apparatus, converts the touch information into contact coordinates, sends the contact coordinates to the processor 510, receives a command sent by the processor 510, and executes the command. In addition, the touch panel 5071 may be implemented in a plurality of types, for example, a resistive type, a capacitive type, an infrared type, and a surface acoustic wave. In addition to the touch panel 5071, the user input unit 507 may further include the other input devices 5072. Specifically, the other input devices 5072 may include but are not limited to a physical keyboard, a function key (for example, a volume control key or a power on/off key), a track ball, a mouse, and a joystick. Details are not described herein.

Further, the touch panel 5071 may cover the display panel 5061. After detecting a touch operation on or near the touch panel 5071, the touch panel 5071 transmits the touch operation to the processor 510 to determine a type of a touch event. Then the processor 510 provides corresponding visual output on the display panel 5061 based on the type of the touch event. In FIG. 5, the touch panel 5071 and the display panel 5061 serve as two independent components to implement input and output functions of the terminal. However, in some embodiments, the touch panel 5071 and the display panel 5061 may be integrated to implement the input and output functions of the terminal. This is not specifically limited herein.

The interface unit 508 is an interface for connecting an external apparatus to the terminal 500. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, or a headset port. The interface unit 508 may be configured to receive input (for example, data information and electric power) from the external apparatus, and transmit the received input to one or more elements in the terminal 500; or may be configured to transmit data between the terminal 500 and the external apparatus.

The memory 509 may be configured to store software programs and various types of data. The memory 509 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 509 may include a high-speed random access memory, or may include a non-volatile memory, for example, at least one magnetic disk storage device or a flash memory device, or another volatile solid-state storage device.

The processor 510 is a control center of the terminal, connects various parts of the entire terminal by using various interfaces and lines, and executes various functions and data processing of the terminal by running or executing a software program and/or a module stored in the memory 509 and invoking data stored in the memory 509, so as to perform overall monitoring on the terminal. The processor 510 may include one or more processing units. Optionally, the processor 510 may integrate an application processor and a modem processor. The application processor mainly processes an operating system, a user interface, an application program, and the like. The modem processor mainly processes wireless communication. It can be understood that the modem processor may be alternatively not integrated in the processor 510.

The terminal 500 may further include a power supply 511 (for example, a battery) that supplies power to each component. Optionally, the power supply 511 may be logically connected to the processor 510 by using a power management system, so as to implement functions such as charging management, discharging management, and power consumption management by using the power management system.

In addition, the terminal 500 may further include some functional modules that are not shown. Details are not described herein.

Figure 6:
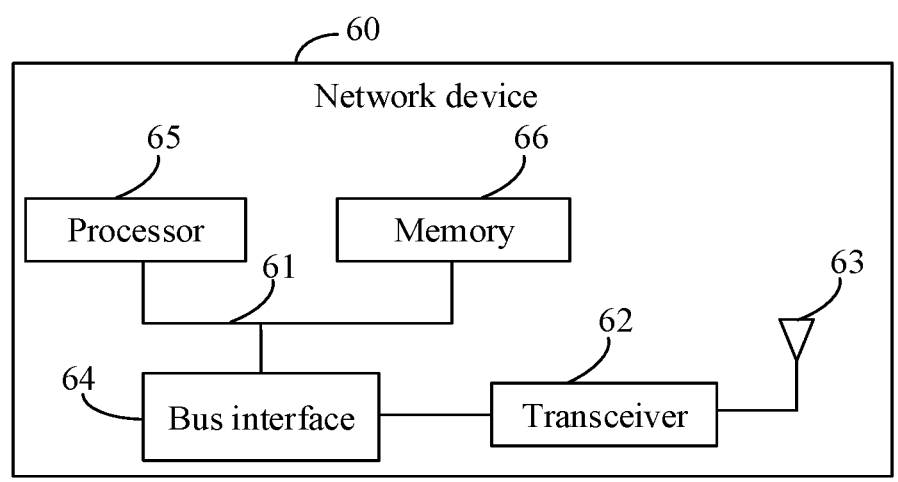
FIG. 6 is a schematic structural diagram of a network device according to an embodiment of this disclosure.

Specifically, FIG. 6 is a schematic diagram of a hardware structure of a network device for implementing the embodiments of this disclosure. The network device 60 includes but is not limited to a bus 61, a transceiver 62, an antenna 63, a bus interface 64, a processor 65, and a memory 66.

In this embodiment of this disclosure, the network device 60 further includes a program that is stored in the memory 66 and capable of running on the processor 65.

Optionally, when the network device 60 is a sender, the following steps are implemented when the program is executed by the processor 65:

generating a plurality of RRC segments by using an RRC segmentation function of an RRC layer entity of the network device 60 or an RRC segmentation function of a new protocol layer entity, where each of the plurality of RRC segments carries partial data content of an RRC message generated by the network device 60; and sending the plurality of RRC segments to a terminal.

Optionally, when the network device 60 is a receiver, the following steps are implemented when the program is executed by the processor 65:

receiving a plurality of RRC segments from a terminal, where each of the plurality of RRC segments carries partial data content of an RRC message generated by the terminal; and reassembling the plurality of RRC segments by using an RRC reassembly function of an RRC layer entity of the network device 60 or an RRC reassembly function of a new protocol layer entity, to obtain the complete RRC message.

The transceiver 62 is configured to send and receive data under control of the processor 65.

In FIG. 6, in a bus architecture (represented by the bus 61), the bus 61 may include any quantity of interconnected buses and bridges, and the bus 61 connects various circuits that include one or more processors represented by the processor 65 and a memory represented by the memory 66. The bus 61 may further connect various other circuits, such as a peripheral device, a voltage regulator, and a power management circuit. These are well-known in the art, and therefore are not further described in this specification. The bus interface 64 provides an interface between the bus 61 and the transceiver 62. The transceiver 62 may be one element, or may be a plurality of elements, for example, a plurality of receivers and transmitters, and provides a unit for communicating with various other apparatuses on a transmission medium. Data processed by the processor 65 is transmitted on a wireless medium through the antenna 63. Further, the antenna 63 receives data and transmits the data to the processor 65.

The processor 65 is responsible for managing the bus 61 and general processing, and may further provide various functions, including timing, a peripheral interface, voltage regulation, power management, and other control functions. The memory 66 may be used to store data that is used by the processor 65 when the processor 65 performs an operation.

Optionally, the processor 65 may be a CPU, an ASIC, an FPGA, or a CPLD.

An embodiment of this disclosure further provides a computer-readable storage medium. The computer-readable storage medium stores a program. When the program is executed by a processor, the processes in the foregoing embodiments of the data transmission method are implemented, and a same technical effect can be achieved. To avoid repetition, details are not described herein again. For example, the computer-readable storage medium is a read-only memory (ROM), a random access memory (RAM), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

Based on the foregoing descriptions of the implementations, a person skilled in the art may clearly understand that the method in the foregoing embodiments may be implemented by software and a necessary general-purpose hardware platform, or certainly, may be implemented by hardware. In many cases, the implementation by using the software and the necessary general-purpose hardware platform is a better implementation. Based on such an understanding, the technical solutions of this disclosure essentially, or a part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementations. The foregoing specific implementations are merely examples, and do not constitute a limitation. Inspired by this disclosure, a person of ordinary skill in the art can make many variations without departing from the essence of this disclosure or the protection scope of the claims. All these variations shall fall within the protection scope of this disclosure.

What is claimed is:

1. A data transmission method, applied to a sender communications device, wherein the sender communications device is one of a terminal or a network device, and the method comprises:
   generating a plurality of radio resource control RRC segments by using an RRC segmentation function of an RRC layer entity of the sender communications device or an RRC segmentation function of a second protocol layer entity other than the RRC layer entity, wherein each of the plurality of RRC segments carries partial data content of an RRC message generated by the sender communications device; and
   sending the plurality of RRC segments to a receiver communications device,
   wherein when the sender communications device is a terminal, the method further comprises:
   receiving activation signaling or deactivation signaling for the RRC segmentation function from a network device; and
   activating the RRC segmentation function according to the activation signaling, or deactivating the RRC segmentation function according to the deactivation signaling.

2. The method according to claim 1, wherein when the sender communications device is the terminal, the second protocol layer entity is one of the following cases:
   per-signaling radio bearer SRB, per-data radio bearer DRB, per-terminal, and per-cell group; or
   when the sender communications device is a network device, the second protocol layer entity is one of the following cases:
   per-SRB, per-DRB, and per-cell group.

3. The method according to claim 2, wherein when the sender communications device is the terminal, and the second protocol layer entity is per-cell group, the method further comprises:
   receiving cell group configuration information from a network device, wherein the cell group configuration information comprises configuration-related information of the second protocol layer entity; and
   when the second protocol layer entity has not been established, establishing, based on the configuration-related information of the second protocol layer entity, a second protocol layer entity corresponding to a master cell group MCG and/or a secondary cell group SCG; or
   when the second protocol layer entity has been established, resetting, releasing, or initiating a reconfiguration procedure for the second protocol layer entity based on the configuration-related information of the second protocol layer entity, or when the sender communications device is a network device, and the second protocol layer entity is per-cell group, the method further comprises:

obtaining cell group configuration information, wherein the cell group configuration information comprises configuration-related information of the second protocol layer entity; and when the second protocol layer entity has not been established, establishing, based on the configuration-related information of the second protocol layer entity, a second protocol layer entity corresponding to an MCG and/or an SCG; or when the second protocol layer entity has been established, resetting, releasing, or reconfiguring the second protocol layer entity based on the configuration-related information of the second protocol layer entity.

4. The method according to claim 2, wherein when the sender communications device is the terminal, and the second protocol layer entity is per-SRB or per-DRB, the method further comprises:

receiving SRB configuration information or DRB configuration information from a network device; and establishing and/or releasing, based on the SRB configuration information, a second protocol layer entity corresponding to a related SRB; or establishing and/or releasing, based on the DRB configuration information, a second protocol layer entity corresponding to a related DRB;

or when the sender communications device is a network device, and the second protocol layer entity is per-SRB or per-DRB, the method further comprises:

obtaining SRB configuration information or DRB configuration information; and establishing and/or releasing, based on the SRB configuration information, a second protocol layer entity corresponding to a related SRB; or establishing and/or releasing, based on the DRB configuration information, a second protocol layer entity corresponding to a related DRB.

5. The method according to claim 1, wherein an activation condition for the RRC segmentation function is at least one of the following:

the network device receives partial capability information reported by the terminal;

the network device receives capability-related information sent by the terminal, wherein the capability-related information indicates that capability information of the terminal exceeds a maximum size of a packet data convergence protocol PDCP service data unit SDU;

the network device receives auxiliary information sent by the terminal, wherein the assistance information indicates that capability information of the terminal exceeds a maximum size of a PDCP SDU; or the network device receives an RRC segmentation function activation request message sent by the terminal.

6. The method according to claim 1, wherein a deactivation condition for the RRC segmentation function is at least one of the following:

the network device has not received, within a preset time, partial capability information reported by the terminal;

the network device has not received, within a preset time, capability-related information sent by the terminal, wherein the capability-related information indicates that capability information of the terminal exceeds a maximum size of a PDCP SDU;

the network device has not received, within a preset time, assistance information sent by the terminal, wherein the assistance information indicates that capability information of the terminal exceeds a maximum size of a PDCP SDU;

the network device receives an RRC segmentation function deactivation request message sent by the terminal; or sizes of all RRC messages received by the network device from the terminal within a preset time are less than a first preset threshold.

7. The method according to claim 1, wherein the activation signaling is in at least one of the following forms:

a media access control MAC control element CE, downlink control information DCI, and an RRC message; and the deactivation signaling is in at least one of the following forms:

a MAC CE, DCI, and an RRC message.

8. The method according to claim 1, wherein when the RRC layer entity or the second protocol layer entity that carries the RRC segmentation function is per-SRB, the activation signaling comprises activation indication information for a related SRB, and the deactivation signaling comprises deactivation indication information for a related SRB; or when the RRC layer entity or the second protocol layer entity that carries the RRC segmentation function is per-DRB, the activation signaling comprises activation indication information for a related DRB, and the deactivation signaling comprises deactivation indication information for a related DRB; or when the RRC layer entity or the second protocol layer entity that carries the RRC segmentation function is per-cell group, the activation signaling comprises activation indication information for a corresponding MCG and/or SCG, and the deactivation signaling comprises deactivation indication information for a corresponding MCG and/or SCG; or when the RRC segmentation function takes effect for a preset RRC message, the activation signaling comprises indication information used to indicate an RRC message to which the activation signaling is specific, and the deactivation signaling comprises indication information used to indicate an RRC message to which the deactivation signaling is specific.

9. The method according to claim 1, wherein when the sender communications device is the terminal, the RRC segmentation function is specific to at least one of the following RRC messages:

an RRC message that carries a data portion with a size greater than a second preset threshold; or an RRC message used to report a terminal capability;

or when the sender communications device is a network device, the RRC segmentation function is specific to at least one of the following RRC messages:

an RRC message that carries a data portion with a size greater than a third preset threshold;

an RRC reconfiguration message;

an RRC message that carries channel state information-reference signal CSI-RS related measurement configuration information; or an RRC message that carries random access channel RACH configuration information.

10. A data transmission method, applied to a receiver communications device, wherein the receiver communications device is one of a terminal or a network device, and the method comprises:
- receiving a plurality of RRC segments from a sender communications device, wherein each of the plurality of RRC segments carries partial data content of an RRC message generated by the sender communications device; and
- reassembling the plurality of RRC segments by using an RRC reassembly function of an RRC layer entity of the receiver communications device or an RRC reassembly function of a second protocol layer entity other than the RRC layer entity, to obtain the complete RRC message,
- wherein when the receiver communications device is a network device, the method further comprises:
- sending activation signaling or deactivation signaling to a terminal, wherein
- the activation signaling is used to indicate to activate an RRC segmentation function of an RRC layer entity of the terminal or an RRC segmentation function of a second protocol layer entity; and
- the deactivation signaling is used to indicate to deactivate the RRC segmentation function of the RRC layer entity of the terminal or the RRC segmentation function of the second protocol layer entity.

11. The method according to claim 10, wherein when the receiver communications device is a terminal, the second protocol layer entity is one of the following cases:
- per-SRB, per-DRB, per-terminal, and per-cell group; or
- when the receiver communications device is a network device, the second protocol layer entity is one of the following cases:
- per-SRB, per-DRB, and per-cell group.

12. The method according to claim 10, wherein when the receiver communications device is a terminal, and the second protocol layer entity is per-cell group, the method further comprises:
- receiving cell group configuration information from a network device, wherein the cell group configuration information comprises configuration-related information of the second protocol layer entity; and
- when the second protocol layer entity has not been established, establishing, based on the configuration-related information of the second protocol layer entity, a second protocol layer entity corresponding to an MCG and/or an SCG; or
- when the second protocol layer entity has been established, resetting, releasing, or initiating a reconfiguration procedure for the second protocol layer entity based on the configuration-related information of the second protocol layer entity,
or
- when the receiver communications device is a network device, and the second protocol layer entity is per-cell group, the method further comprises:
- obtaining cell group configuration information, wherein the cell group configuration information comprises configuration-related information of the second protocol layer entity; and
- when the second protocol layer entity has not been established, establishing, based on the configuration-related information of the second protocol layer entity, a second protocol layer entity corresponding to an MCG and/or an SCG; or
- when the second protocol layer entity has been established, resetting, releasing, or reconfiguring the second protocol layer entity based on the configuration-related information of the second protocol layer entity.

13. The method according to claim 12, wherein when the receiver communications device is a terminal, and the second protocol layer entity is per-SRB or per-DRB, the method further comprises:
- receiving SRB configuration information or DRB configuration information from a network device; and
- establishing and/or releasing, based on the SRB configuration information, a second protocol layer entity corresponding to a related SRB; or establishing and/or releasing, based on the DRB configuration information, a second protocol layer entity corresponding to a related DRB;
or
- when the receiver communications device is a network device, and the second protocol layer entity is per-SRB or per-DRB, the method further comprises:
- obtaining SRB configuration information or DRB configuration information; and
- establishing and/or releasing, based on the SRB configuration information, a second protocol layer entity corresponding to a related SRB; or establishing and/or releasing, based on the DRB configuration information, a second protocol layer entity corresponding to a related DRB.

14. The method according to claim 10, wherein an activation condition for the RRC segmentation function is at least one of the following:
- the network device receives partial capability information reported by the terminal;
- the network device receives capability-related information sent by the terminal, wherein the capability-related information indicates that capability information of the terminal exceeds a maximum size of a PDCP SDU;
- the network device receives assistance information sent by the terminal, wherein the assistance information indicates that capability information of the terminal exceeds a maximum size of a PDCP SDU; or
- the network device receives an RRC segmentation function activation request message sent by the terminal.

15. A communications device, wherein the communications device is a receiver communications device, the receiver communications device is one of a terminal or a network device, the communications device comprises a memory, a processor, and a program that is stored in the memory and capable of running on the processor, wherein when the program is executed by the processor, the steps of the data transmission method according to claim 10 are implemented.

16. A communications device, wherein the communications device is a sender communications device, the sender communications device is one of a terminal or a network device, and the communications device comprises a memory, a processor, and a program that is stored in the memory and capable of running on the processor, wherein when the program is executed by the processor, following steps are implemented:
- generating a plurality of radio resource control RRC segments by using an RRC segmentation function of an RRC layer entity of the sender communications device or an RRC segmentation function of a second protocol layer entity other than the RRC layer entity, wherein each of the plurality of RRC segments carries partial data content of an RRC message generated by the sender communications device; and sending the plurality of RRC segments to a receiver communications device, wherein when the sender communications device is a terminal, the method further comprises:

receiving activation signaling or deactivation signaling for the RRC segmentation function from a network device; and activating the RRC segmentation function according to the activation signaling, or deactivating the RRC segmentation function according to the deactivation signaling.

17. The communications device according to claim 16, wherein when the sender communications device is the terminal, the RRC segmentation function is specific to at least one of the following RRC messages:

an RRC message that carries a data portion with a size greater than a second preset threshold; or an RRC message used to report a terminal capability; or when the sender communications device is a network device, the RRC segmentation function is specific to at least one of the following RRC messages:

an RRC message that carries a data portion with a size greater than a third preset threshold;

an RRC reconfiguration message;

an RRC message that carries channel state information-reference signal CSI-RS related measurement configuration information; or an RRC message that carries random access channel RACH configuration information.

* * * * *